(12) United States Patent
Shefi

(10) Patent No.: US 9,165,408 B2
(45) Date of Patent: Oct. 20, 2015

(54) METHOD AND SYSTEM FOR BROWSING VISUAL CONTENT DISPLAYED IN A VIRTUAL THREE-DIMENSIONAL SPACE

(75) Inventor: Yoav Shefi, Tel Aviv (IL)

(73) Assignee: VISUAL DOMAINS LTD., Ramat-Gan (IL)

(*) Notice: Subject to any disclaimer, the term of this patent is extended or adjusted under 35 U.S.C. 154(b) by 194 days.

(21) Appl. No.: 13/132,121

(22) PCT Filed: Dec. 1, 2009

(86) PCT No.: PCT/IL2009/001132
§ 371 (c)(1),
(2), (4) Date: Jul. 5, 2011

(87) PCT Pub. No.: WO2010/064236
PCT Pub. Date: Jun. 10, 2010

(65) Prior Publication Data
US 2011/0261052 A1    Oct. 27, 2011

Related U.S. Application Data

(60) Provisional application No. 61/193,444, filed on Dec. 1, 2008.

(51) Int. Cl.
*G06T 19/00* (2011.01)
*G06T 19/20* (2011.01)
*G06T 17/20* (2006.01)

(52) U.S. Cl.
CPC ............... *G06T 19/20* (2013.01); *G06T 17/20* (2013.01); *G06T 19/00* (2013.01); *G06T 2219/2016* (2013.01)

(58) Field of Classification Search
CPC .. G06T 19/20; G06T 2219/2016; G06T 15/00

USPC ........................................................ 345/418
See application file for complete search history.

(56) References Cited

U.S. PATENT DOCUMENTS 5,276,793 A    1/1994   Borgendale et al.
5,341,466 A    8/1994   Perlin et al.
(Continued)

FOREIGN PATENT DOCUMENTS

EP    1 014 257 A1    6/2000
EP    1 093 090 A1    4/2001
(Continued)

OTHER PUBLICATIONS

Arai et al. ("InfoLead—A New Concept for Cruising Navigation Technology", Proceedings of the 2002 Symposium on Applications and the Internet (SAINTí02).*
(Continued)

*Primary Examiner* — James A Thompson
*Assistant Examiner* — Tapas Mazumder
(74) *Attorney, Agent, or Firm* — Browdy and Neimark, PLLC

(57) ABSTRACT

The invention provides a method for constructing a zoom path between a predetermined viewing point $P_{n+1}$ in a three-dimensional (3D) virtual space and a target point $P_0$ in the 3D space, and for zooming in or zooming out along the zoom path. The target point is assigned control points in the 3D space, and the zoom path of the invention is nonlinear and passes through at least one of the control points. During zooming, the viewing direction is continuously selected to provide an aesthetically acceptable zooming effect.

13 Claims, 7 Drawing Sheets

(56) References Cited

U.S. PATENT DOCUMENTS

| | | |
|---|---|---|
| 5,634,064 A | 5/1997 | Warnock et al. |
| 5,671,381 A | 9/1997 | Strasnick |
| 5,689,287 A | 11/1997 | Mackinlay et al. |
| 5,689,628 A | 11/1997 | Robertson |
| 6,011,905 A | 1/2000 | Huttenlocher et al. |
| 6,175,843 B1 | 1/2001 | Muramoto et al. |
| 6,222,547 B1 | 4/2001 | Schwuttke et al. |
| 6,226,009 B1 | 5/2001 | Carraro et al. |
| 6,329,994 B1 | 12/2001 | Gever et al. |
| 6,331,861 B1 | 12/2001 | Gever et al. |
| 6,577,330 B1 | 6/2003 | Tsuda et al. |
| 6,650,343 B1 | 11/2003 | Fujita et al. |
| 6,938,218 B1 | 8/2005 | Rosen |
| 8,035,635 B2 | 10/2011 | Shefi |
| 2002/0135538 A1 | 9/2002 | Rosen |
| 2003/0197737 A1 | 10/2003 | Kim |
| 2004/0116808 A1* | 6/2004 | Fritz et al. ............. 600/437 |
| 2005/0018892 A1* | 1/2005 | Pieper et al. ............. 382/131 |
| 2006/0103650 A1* | 5/2006 | Kamiwada et al. ....... 345/427 |
| 2012/0007862 A1 | 1/2012 | Shefi |

FOREIGN PATENT DOCUMENTS

| | | |
|---|---|---|
| JP | 11-65806 A | 3/1999 |
| JP | 11-85432 A | 3/1999 |
| JP | 2000-137563 A | 5/2000 |
| JP | 2000-172248 A | 6/2000 |
| JP | 2000-512039 A | 9/2000 |
| WO | 98/01824 A1 | 1/1998 |

OTHER PUBLICATIONS

G. Robertson et al., "The Task Gallery: A 3D Window Manager", Microsoft Research, Redmond, WA, SIGCHI conference on Human factors in Computing systems, pp. 494-501, ACM 2000.

G. Robertson et al., "Data Mountain: Using Spatial Memory for Document Management", Microsoft Research, Redmond, WA, 1998.

P. Hetzel, "Step Into You New Browser", Mar. 5, 2001, An MIT Enterprise Technology Review, obtained from the Internet on Mar. 31, 2002, file://\\Elgotfrid-co\1\New%20Prior%20art%20research\Step%20Into%20Your%20New%. . . .

J. S. Pierce et al., "Toolspaces and Glances: Storing, Accessing, and Retrieving Objects in 3D Desktop Applications", Microsoft Research, 1999 symposium on Interactive 3D graphics, pp. 163-168. ACM, 1999.

Maarten Van Dantzich et al., "Application Redirection: Hosting Windows Application in 3D"; 1999, pp. 87-91, ACM, NY.

James D. Foley et al., "Computer Graphics, Principles and Practice, Second Edition in C", Addison-Wesley Publishing Co., Boston, USA, pp. 229-242, 1996.

* cited by examiner

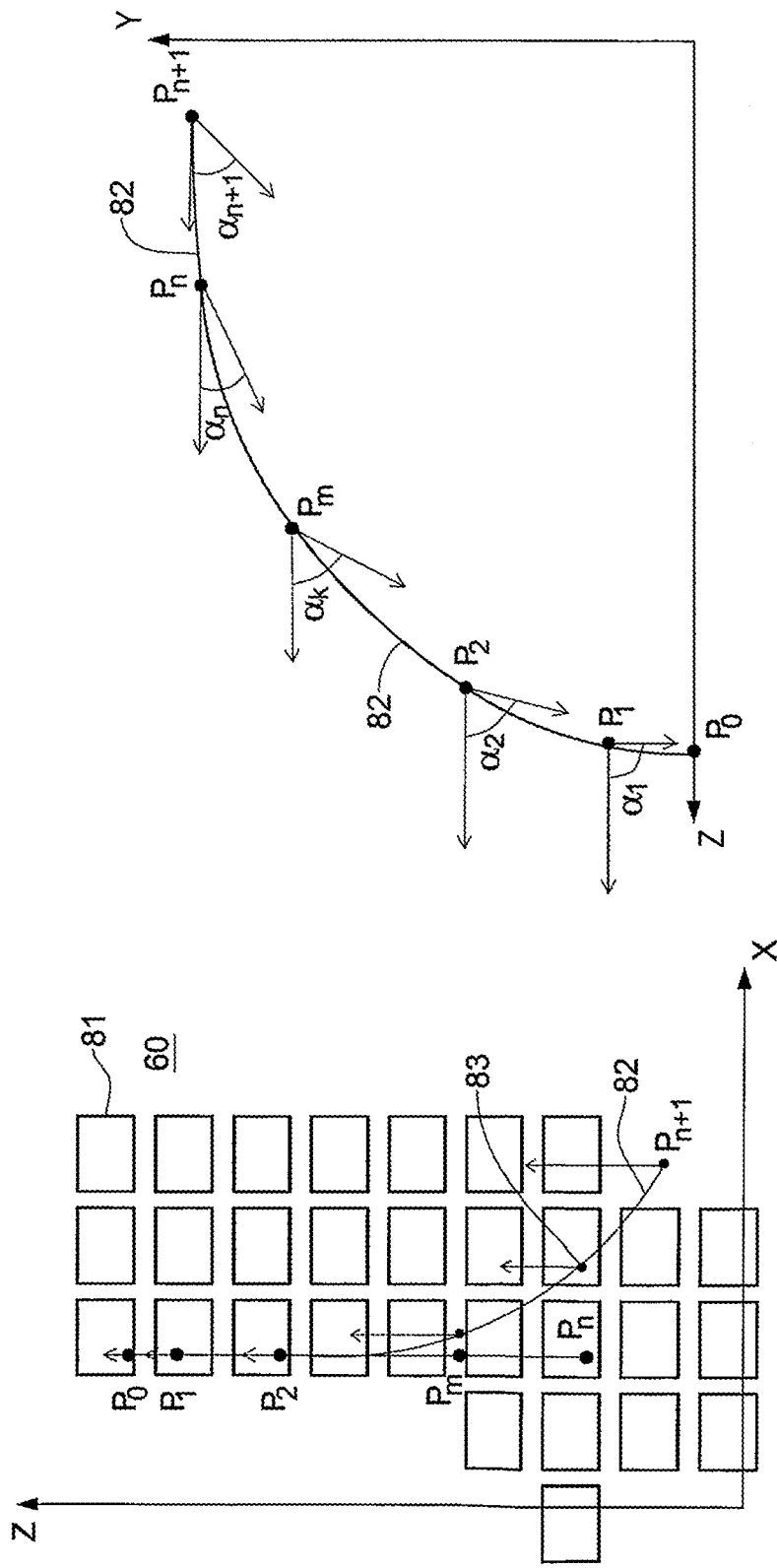

FIG.3d

METHOD AND SYSTEM FOR BROWSING VISUAL CONTENT DISPLAYED IN A VIRTUAL THREE-DIMENSIONAL SPACE

CROSS-REFERENCE TO RELATED APPLICATIONS

This application is a U.S. Nationalization of International Application No. PCT/IL2009/001132 filed 1 Dec. 2009, entitled "METHOD AND SYSTEM FOR BROWSING VISUAL CONTENT DISPLAYED IN A VIRTUAL THREE-DIMENSIONAL SPACE," which claims priority to U.S. Provisional Application No. 61/193,444 filed 1 Dec. 2008, the entireties of both of the foregoing applications are incorporated herein by reference.

FIELD OF THE INVENTION

This invention relates to virtual three dimensional spaces in which visual content is displayed.

BACKGROUND OF THE INVENTION

Computer screens and other two-dimensional (2D) surfaces are commonly used for displaying 2D visual content such as a page of text, a diagram or a website page. Some forms of visual content contain two or more content forms, such as a page consisting of text and diagrams, or a website page containing information related to the site and unrelated advertising. Usually, only one page is displayed on a screen at a time and the page is confined to the boundaries of the screen. The different elements in a page must therefore compete with each other for space and the viewer's attention, even if they are related to each other. Existing website pages are therefore generally overcrowded by advertising and this is the major reason why Internet advertising is considered ineffective.

When pages are displayed in this way, changing a displayed page (known as browsing or navigating) is a discontinuous process wherein an initially displayed page is removed from the screen and a second page is subsequently displayed. The ability to view only one page at a time makes it difficult for a viewer to know his location at a website and also creates uncertainty while navigating through the site. Changes in the size of a page are also done in discrete steps, and a return to the browser is required for each step change.

An alternative method for displaying visual content on a screen involves arranging several pages in a virtual three-dimensional (3D) space and projecting a portion of the 3D space onto a 2D surface. With this method of displaying visual content, a viewer may continuously navigate from page to page. Methods of displaying visual content in a three dimensional space, and browsing the visual content in the space are disclosed, for example, in Applicant's copending US 20020176636, Robertson et al (Data Mountain: using Spatial memory for document Management), and Robertson et al (Task Gallery: a 3D Window Manager)

Several projections are known for projecting the 3D space onto the 2D surface Applicant's US 20020176636, for example, discloses projecting the 3D space onto a viewing surface using a single perspective projection. In this case, visual content is positioned in the 3D space with at least one page positioned in a plane, referred to as the "base plane". A viewpoint and a viewing ray having a vertex at the viewpoint are selected from which to view a portion of the 3D space, including a portion of the base plane. Once the viewing ray has been selected, the viewing surface is positioned in the 3D space so that it intersects the viewing ray at a predetermined distance from the viewpoint. The viewpoint and viewing surface define a pyramid consisting of the set of rays having the viewpoint as vertex and passing through a point on the edge of the viewing surface. The portion of the 3D space located in the frustum of the pyramid determined by the viewing surface (referred to as the "viewing space") is perspectively projected onto the viewing surface. The projection of the 3D space onto the viewing surface is then displayed on a display device such as a computer screen, television or a head mounted display for stereo viewing.

Browsing the visual content in the 3D space involves changing the view of the 3D space, so as to make the visual content more amenable to viewing. This is typically done by the user using a computer input device, such as, mouse or keyboard. Applicant's US 20020176636 discloses changing the perspective continuously (for example 20 to 30 times per second). Continuously changing the perspective creates an impression of smooth gliding through the 3D space over the base plane. The user may zoom into a page for closer inspection, or zoom out from a page.

Moving the view point in a 3D virtual space towards a target point in the 3D space is referred to herein as "zooming in" on the target point. Moving the view point in the 3D space away from a target point in the 3D space is referred to herein as "zooming out" from the target point. As used herein, the term "zooming" includes zooming in and zooming out. Zooming requires generating a zoom path between the target point and a predetermined viewpoint.

SUMMARY OF THE INVENTION

The present invention provides a method and system for browsing visual content displayed in a three-dimensional space. The invention may be used to browse visual content embedded in the three dimensional space by any method known in the art for embedding visual content in a three dimensional space.

In its first aspect, the present invention provides a method for constructing a zoom path between a predetermined viewing point $P_{n+1}$ in a three-dimensional (3D) virtual space and a target point $P_0$ in the 3D space. The target point has an integer $n \geq 2$ of predetermined control points $P1, \ldots Pn$ in the 3D space, where the distance of Pk from the target point $P_0$, according to a predetermined metric, such as a Euclidean metric, increases with increasing k (the distance between $P_k$ to $P_0$ in the 3D space is less than the distance between $P_{k+1}$ to $P_0$ for all $1<k<n-1$) Furthermore, the points $P_0, \ldots P_n$ are coplanar. The zoom path of the invention is nonlinear and passes through at least one of the control points. Also in accordance with the invention, a projection of the zoom path onto the plane containing points $P_0, \ldots P_n$ has a continuous derivative In various embodiments of the invention, a portion of the zoom path containing the points $P_1, \ldots, P_m$, is obtained by polynomial interpolation between $P_k$ and $P_{k+1}$ for k=1 to m−1. For example, the zoom path may be constructed as a spline having a predetermined degree, and obtained in a calculation involving the point $P_{n+1}$ and at least two of the points $P_1, \ldots P_n$.

In its second aspect, the present invention provides a method for zooming between a target point $P_0$ in a three-dimensional (3D) virtual space and a predetermined viewing point $P_{n+1}$ in the 3D space. As above, the target point has an integer $n \geq 2$ of predetermined control points $P_1, \ldots P_n$ in the 3D space, where the points $P_0, \ldots P_n$ are coplanar, and where the distance between $P_k$ to $P_0$ in the 3D space increases with increasing k by any predetermined metric. In addition, the point $P_k$, k=1 to n+1 has a predetermined viewing ray lying in a plane parallel to the plane of the points $P_0, \ldots P_n$. The viewing ray of the point $P_k$, k=1 to n+1 thus has a direction that may be specified by an angle $\alpha_k$, relative to a fixed ray in the plane of the points $P_0, \ldots P_n$. The angles $\alpha_k$ may be selected so that $\alpha_k < \alpha_{k+1}$ for k=1, ... n or $\alpha_k > \alpha_{k+1}$ for k=1 to n.

The method of zooming, in accordance with this aspect of the invention first involves generating a zoom path in the 3D space between the predetermined viewpoint $P_{n+1}$ and the control point $P_1$ by the method of the invention. To each of a plurality of points on the zoom path a viewing ray lying in a plane parallel to the plane of the points $P_0, \ldots P_n$ is assigned that has a viewing angle having a direction specified by an angle $\alpha$, relative to the fixed ray such that the viewing angle assigned to the point $P_k$ is $\alpha_k$, for any one of the points $P_k$ on the zoom path. Starting with a viewpoint at either the predetermined viewpoint (for zooming in) or at the point $P_1$ (for zooming out), a 2D viewing surface is positioned between the viewpoint and the target point with the viewing ray of the viewpoint pointing towards a predetermined fixed point on the viewing surface and with the fixed point a predetermined distance from the initial point. A portion of the 3D space is then projected onto the viewing surface and the projection is displayed on a display device such as a computer monitor. The view point is then moved an incremental step along the zoom path to determine a new current viewing point. The process is then repeated until the viewpoint has arrived at either $P_1$ (zooming in) or the predetermined viewpoint (zooming out). The 3D space may be projected onto the viewing surface by projection known in the art, such as a perspective projection determined by the position of the viewing surface and the direction of the viewing ray.

The invention also provides a system for carrying out the method of the invention. The system consists of a computer processing unit (CPU). The CPU is configured to run a software that executes the steps of the method of the invention. The system preferably also includes a computer input device, such as a computer mouse, keyboard, joystick, or remote control, for selecting a view ray. The system may optionally include a display device for displaying the viewing surface such as a computer monitor, television, or set-up box. The CPU may optionally be configured to display the viewing surface on the display device.

Thus, in its first aspect, the present invention provides a method for determining a zoom path between predetermined viewing point $P_{n+1}$ in a three-dimensional (3D) virtual space and a target point $P_0$ in the 3D space, the target point having an integer n≥2 of predetermined control points $P_1, \ldots P_n$ in the 3D space, the distance between $P_k$ to $P_0$ in the 3D space being less than the distance between $P_{k+1}$ to $P_0$ in the 3D space for all 1<k<n−1, the points $P_0, \ldots P_n$ being coplanar, the method comprising:
(a) generating a nonlinear zoom path in the 3D space between the viewing point $P_{n+1}$ to the control point $P_1$, the zoom path passing through the points $P_1, \ldots, P_m$, where m is an integer satisfying 1≤m≤n, wherein a projection of the zoom path onto the plane containing points $P_0, \ldots P_n$ has a continuous derivative In its second aspect, the invention provides a method for zooming between a target point $P_0$ in a three-dimensional (3D) virtual space and a predetermined viewing point $P_{n+1}$ in the 3D space, the target point having an integer n≥2 of predetermined control points $P_1, \ldots P_n$ in the 3D space, the distance between $P_k$ to $P_0$ in the 3D space being less than the distance between $P_{k+1}$ to $P_0$ in the 3D space for all 1<k<n−1, the points $P_0, \ldots P_n$ being coplanar in the 3D space, the point $P_k$, k=1 to n+1 having a predetermined viewing ray lying in a plane parallel to the plane of the points $P_0, \ldots P_n$, the viewing ray the point $P_k$, k=1 to n+1 having a direction determined by an angle $\alpha_k$, relative to a fixed ray in the plane of the points $P_0, \ldots P_n$, for k=1, ... n+1, the method comprising:
(b) generating a nonlinear zoom path in the 3D space between the predetermined viewpoint $P_{n+1}$ and the control point $P_1$ by the method of any one of Claims 1 to 4;
(c) assigning to each of a plurality of points on the zoom path a viewing ray lying in a plane parallel to the plane of the points $P_0, \ldots P_n$ and having a viewing angle having a direction specified by an angle $\alpha$, relative to the fixed ray such that the viewing angle assigned to the point $P_k$ is $\alpha_k$, for any one of the points $P_k$ on the zoom path;
(d) setting the predetermined viewpoint or the point $P_1$ as the current viewpoint;
(e) positioning a 2D viewing surface between the current viewpoint and the target point with the viewing ray of the current viewpoint $P_{n+1}$ pointing towards a predetermined fixed point on the viewing surface with the fixed point a predetermined distance from the initial point;
(f) projecting at least a portion of the 3D space onto the viewing surface;
(g) moving the current viewpoint an incremental step along the zoom path to determine a new current viewing point;
(h) positioning the viewing surface so that the viewing ray of the new current viewing point points towards the fixed point on the viewing surface and so that the distance between the new current viewing point and the fixed point is the predetermined distance;
(i) projecting at least a portion of the 3D space onto the viewing surface;
(j) displaying the projection on the viewing surface on a display device; and
(k) repeating steps (f) to (j) as required until the current viewing point is the point $P_1$ or the point $P_1$.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 2a, 2b, and 2c show construction of a zoom path in accordance with one embodiment of the invention; and FIGS. 3a, 3b, 3c, and 3d show a sequence of screenshots obtained during zooming in to a target point in accordance with one embodiment of the invention.

DETAILED DESCRIPTION OF EMBODIMENTS

Figure 1:
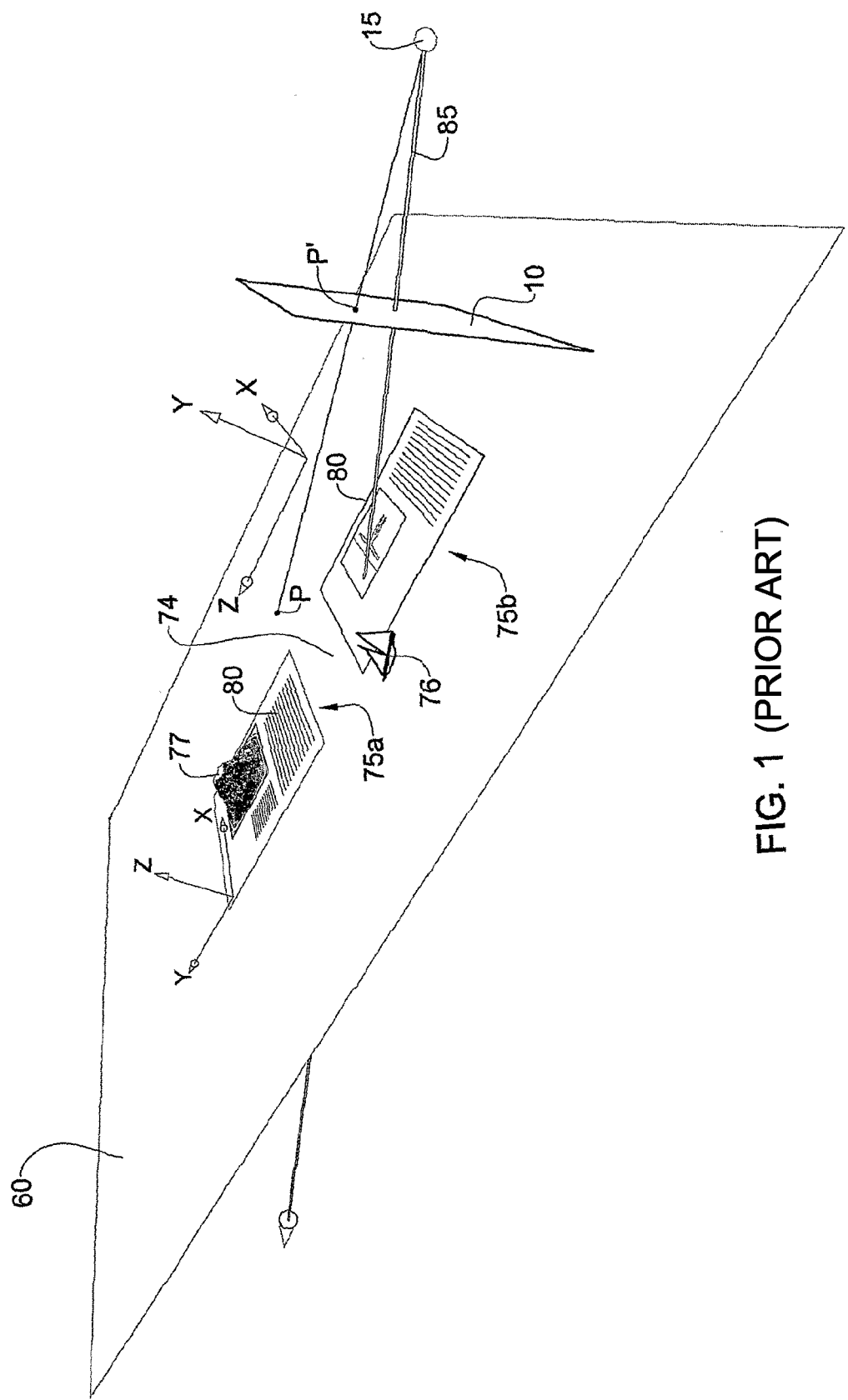
FIG. 1 shows content elements arranged on a baseplane in a 3D virtual space.

FIG. 1 shows a 3D virtual space 5 in which a 3D coordinate system has been created having an x-axis, a y-axis and a z-axis. The three axes are preferably mutually perpendicular. A base plane 60 in the 3D space is parallel to the x and z-axes. The 3D space contains content elements, such as pages 75a and 75b which have been positioned in the base plane 60. The pages 75a and 75b have been positioned in the base plane with their sides 80 parallel to the z-axis and with their tops oriented in the same direction. A content element 76 that is not part of the layout of either of the pages 75a and 75b has been placed on the base plane so as to be associated with the nearby page 75b. The page 75a contains a content element 77 that is a 3D volumetric content element.

A user uses a computer input device, such as a computer mouse, to select a viewpoint 15 and a viewing ray 85 extending from the viewpoint 15. The view point defines the position of the viewer eye. The view ray 85 determines a perspective from which the 3D space is to be viewed. A viewing plane 10 is then positioned in the 3D space, usually perpendicular to the viewing ray 85 and at a predetermined distance from the viewpoint 15 surface. A portion of the 3D space is projected onto the 2D surface using any type of projection known in the art. Projecting the 3D space onto the 2D surface may be done, for example, using a perspective projection, or a parallel projection Applicant's US 20020176636 discloses projecting the 3D space onto the viewing surface by means of a perspective projection determined by the viewing ray and the viewing surface. Under this perspective projection, as shown in FIG. 2, a point P in the 3D space is projected onto a point P' on the viewing plane 10 so that the points P, P' and the viewpoint 15 are collinear. The projection of the 3D space on the viewing surface 15 may be displayed on a display device such as a computer monitor, television, or set-up box.

Changing the view ray 85 changes the portion of the 3D space projected onto the 2D surface, and/or the perspective from which the 3D space is viewed. Moving the view point in the 3D space towards a target point in the 3D space is referred to herein as "zooming in" on the target point. For example, from the initial position of the viewpoint 15 and the orientation of the viewing ray 85 shown in FIG. 1, a user may wish to zoom in on a target point $P_0$ in the baseplane 60 Moving the view point in the 3D space away from a target point in the 3D space is referred to herein as "zooming out" from the target point. As used herein, the term "zooming" includes zooming in and zooming out. Zooming requires generating a zoom path between the target point and a predetermined viewpoint. The zoom path is a continuous curve having a first end point at a predetermined viewpoint in the 3D space and a second endpoint in a vicinity of the target point.

In its first aspect, the present invention provides a method for generating a zoom path between a predetermined viewpoint and a predetermined target point in a virtual 3D space. In accordance with this aspect of the invention, the target point is assigned one or more control points that are used in generating a zoom path between the predetermined viewpoint and the target point. The control points are selected to be coplanar with the target point. For example, the control points may lie in a single plane that is parallel to the YZ plane and contains the target point. The control points may depend only upon the coordinates of the target point and are independent of the location of the predetermined viewpoint or the viewing ray of the predetermined viewpoint. The control points may thus be predetermined in advance and stored in a memory, and not necessarily immediately prior to determining the zoom path.

In one embodiment, four control points are assigned to a target point. For example, a first control point $P_4$, is selected, that is the furthest away from the destination point of the four control points and is sufficiently far from the target point that a relatively large amount of the base point including the target point is projected onto the viewing surface when the viewpoint is positioned at $P_4$. For example, when the view point is positioned at $P_4$, two or more pages in the baseplane are projected onto the viewing plane. A second control point, $P_3$, is selected closer to the target point than $P_4$. For example, when the viewpoint is positioned $P_3$, a single page, together with some of its surroundings, is projected onto the viewing plane. A third provisional control point, $P_2$, is selected closer to the target point than $P_3$. For example, when the view point is positioned at $P_3$, a single page is viewed and most, if not all, of the content of the page is legible. A fourth provisional control point, $P_4$, is selected that is closest to the target point than the other three control points $P_2$, $P_3$, and $P_4$.

More generally, n control $P_1, \ldots, P_n$ points are assigned to the target point, where n is an integer that is at least 2. The points $P_1, \ldots, P_n$ are arranged in the 3D space so that the distance between $P_k$ to the target point $P_0$ in the 3D space, using any predetermined metric, is less than the distance between $P_{k+1}$ to target point $P_0$ in the 3D space for all 1<k<n−1. Furthermore, the points $P_0, \ldots P_n$ all lie in a single plane in the 3D space. In one embodiment, the control points have the same relative position to the target point for all possible target points.

Figure 2A:
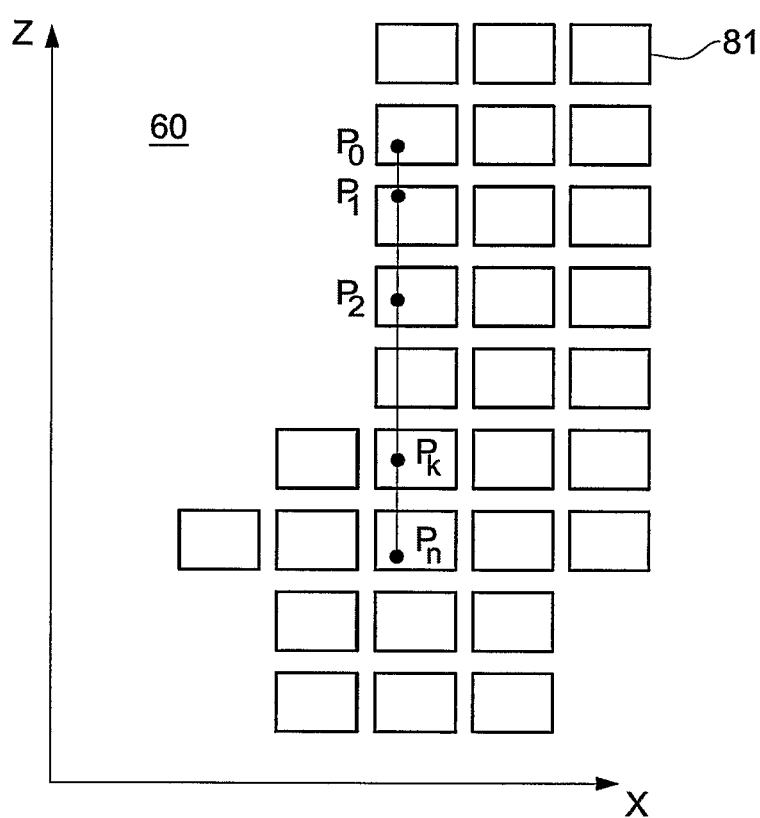

FIG. 2a shows a portion of the baseplane 60 lying in the XZ plane in which several pages 81 have been positioned. A target point $P_0$ lies on one of the pages. Control points $P_1$, $P_2, \ldots P_k, \ldots$ and $P_n$ have been assigned to the target point $P_0$. The target point $P_0$ and the control points are coplanar, and in this example, lie in a plane parallel to the ZY plane. The control points are ordered with increasing distance from the target point $P_0$ with increasing index k.

FIGS. 2b and 2c shows two projections of the 3D space 5. In FIG. 2b, the XZ plane is viewed en face containing the baseplane 60. In FIG. 2c, the XY plane is viewed en face, and the baseplane 60 is viewed from the side. A nonlinear zoom path 82 has been generated between the position of the predetermined viewpoint 15 and the control point $P_1$ (the control point closest to the target point). In accordance with the invention, the zoom path passes through the control points $P_1, \ldots, P_m$, where m is an integer satisfying 1≤m≤n (m=2 in the example of FIG. 2). Also in accordance with the invention, a projection, such as an orthogonal projection, of the zoom path onto the plane containing the points $P_0, \ldots P_n$ has a continuous derivative. The zoom path may be, for example, a spline having a predetermined degree obtained in a calculation involving the initial viewpoint at least two of the control points $P_1, \ldots P_n$. The spline may be calculated, for example using a NURBS method, for example, as disclosed in Cohen et al., 2001, Geometric Modeling with Splines: An Introduction. A. K. Peters, Farin, G., 2002, Curves and Surfaces for CAGD 5th edition. Academic Press, Inc.

The zoom path 81 has a point 83 lying in the same YZ plane as one of the control points (the control point $P_n$ in the example of FIG. 2). The zoom path point 83 and the control point Pn thus have exactly two coordinates that are the same.

Referring again to the example shown in FIG. 2 in which four control points were used, a zoom path 82 was constructed in accordance with the invention. The zoom path 80 connects the predetermined viewpoint $P_{n+1}$ with the control point $P_1$ and passes through the control points $P_1$, and $P_2$. The zoom path 80 has a continuous derivative. In one embodiment, at least one point on the zoom path has exactly two coordinates in common with a control point selected from the control points $P_{m+1}, \ldots, P_n$ Once the zoom path has been generated, a viewing point is moved along the zoom path either towards or away from the control point $P_1$. In accordance with this aspect of the invention, a viewing ray is assigned to a plurality of points on the zoom path, where the viewing rays lie in a plane parallel to the plane of the control points and target point. Since the viewing rays all lie in a single plane, the direction of the viewing angle may be specified by means of an angle α between the viewing ray and a fixed ray in the plane of the viewing ray. Starting with the viewpoint at its initial position, the 2D viewing surface is positioned between the initial viewing point and the target point with the initial viewing ray pointing towards a predetermined fixed point on the viewing surface with the fixed point a predetermined distance from the initial viewpoint. At least a portion of the 3D space is then projected onto the viewing surface, and the projection of the viewing surface is then displayed on a display device such as a computer screen. The view point is then moved in incremental steps along the zoom path towards the control point $P_1$ and away from the predetermined viewpoint $P_{n+1}$ (zooming in), or towards the predetermined viewpoint $P_{n+1}$ and away from the control point $P_1$ (zooming out). At each step, the 2D viewing surface is positioned in the 3D space so that the viewing ray of the current viewing point points towards the fixed point on the viewing surface and so that the distance between the current viewing point and the fixed point is the predetermined distance. At least a portion of the 3D space is projected onto the viewing surface and the projection is displayed on the display device. Any method for projecting a 3D space onto a 2D surface may be used. For example, the 3D space may be projected onto the viewing surface using a perspective projection determined by the current position of the viewpoint and the current view ray. The process continues until the viewpoint is either at $P_1$ or $P_{+1}$. The zooming in terminates at the control point $P_1$ in order to avoid "crashing" into the base plane 60.

Since the viewing ray remains in the same plane during zooming in, the direction of the viewing ray may be specified by means of an angle $\alpha$ between the viewing ray and a fixed ray in the fixed plane. The angle $\alpha$ of each of the plurality of points on the zoom path may be selected so that the target point is always projected onto the viewing surface. The angle $\alpha$ of each of the plurality of points on the zoom path may be selected so that the projection of the target point on the viewing surface always moves monotonically towards the fixed point during the zooming in (the distance between the fixed point and the projection of the target point decreases throughout the zooming in). The angle $\alpha$ may have a continuous derivative between each pair of points control points $P_k$ and $P_{k+1}$ lying on the zoom path. The direction angles assigned to the control points may increase or decrease with increasing distance from the target point. The angle $\alpha$ of each of the plurality of points on the zoom path should be selected so that the target point is projected onto the viewing surface each time the 3D space is projected onto the viewing surface.

In one embodiment, The angles $\alpha$ of each of the plurality of points on the zoom path are selected so that the target point moves monotonically on the viewing surface towards or away from the fixed point on the viewing surface each time the 3D space is projected onto the viewing surface. In another embodiment, the angles $\alpha$ of each of the plurality of points on the zoom path is selected so that a line segment in the baseplane is projected onto a fixed line segment on the 2D viewing surface each time the 3D space is projected onto the viewing surface. In another embodiment, the angle $\alpha$ has a continuous derivative between each pair of control points $P_k$ and $P_{k+1}$. In yet another embodiment, $\alpha_k < \alpha_{k+1}$ for k=1, ... n or $\alpha_k > \alpha_{k+1}$ for k=1 to n.

Figure 3A:
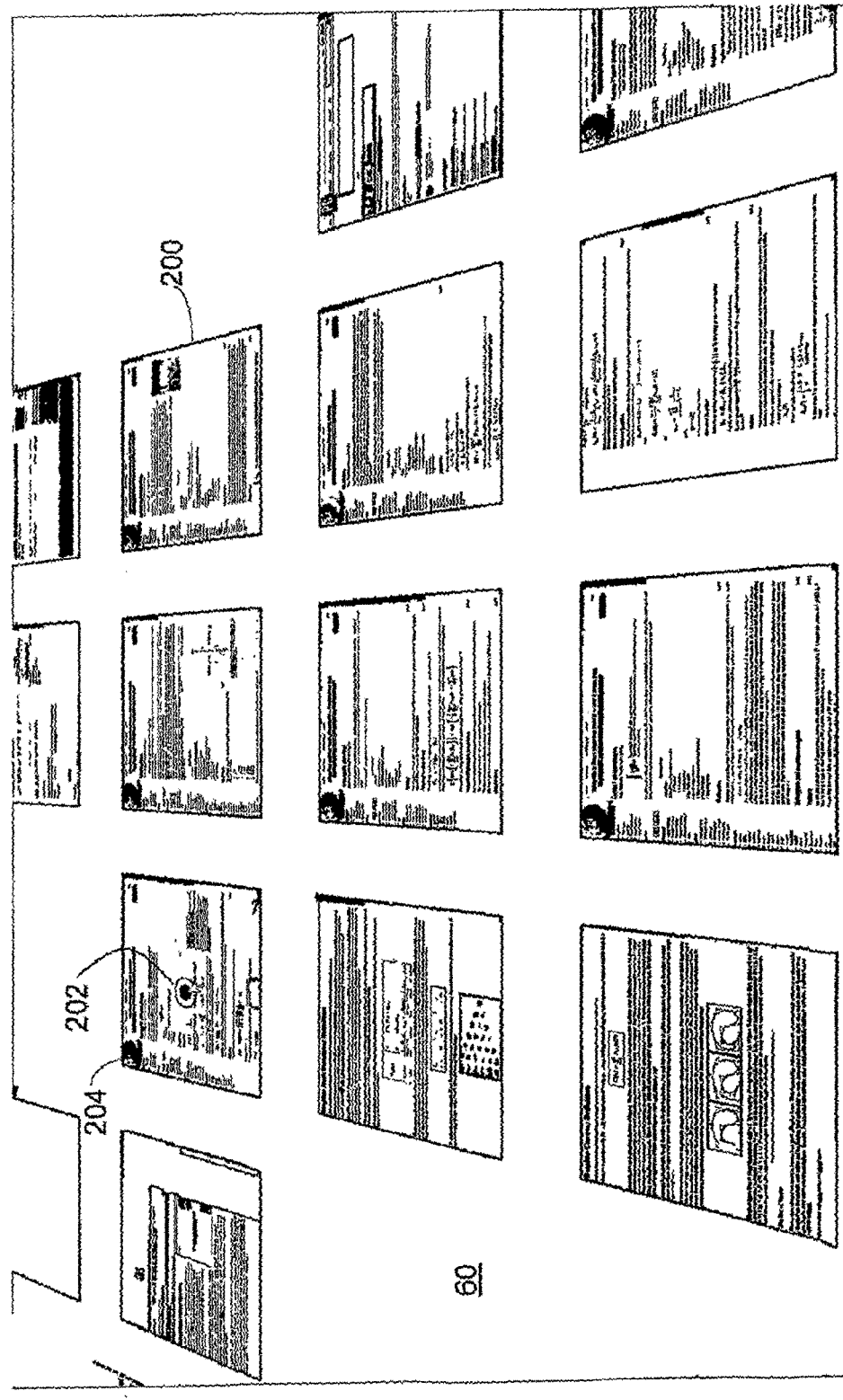
Figure 3B:
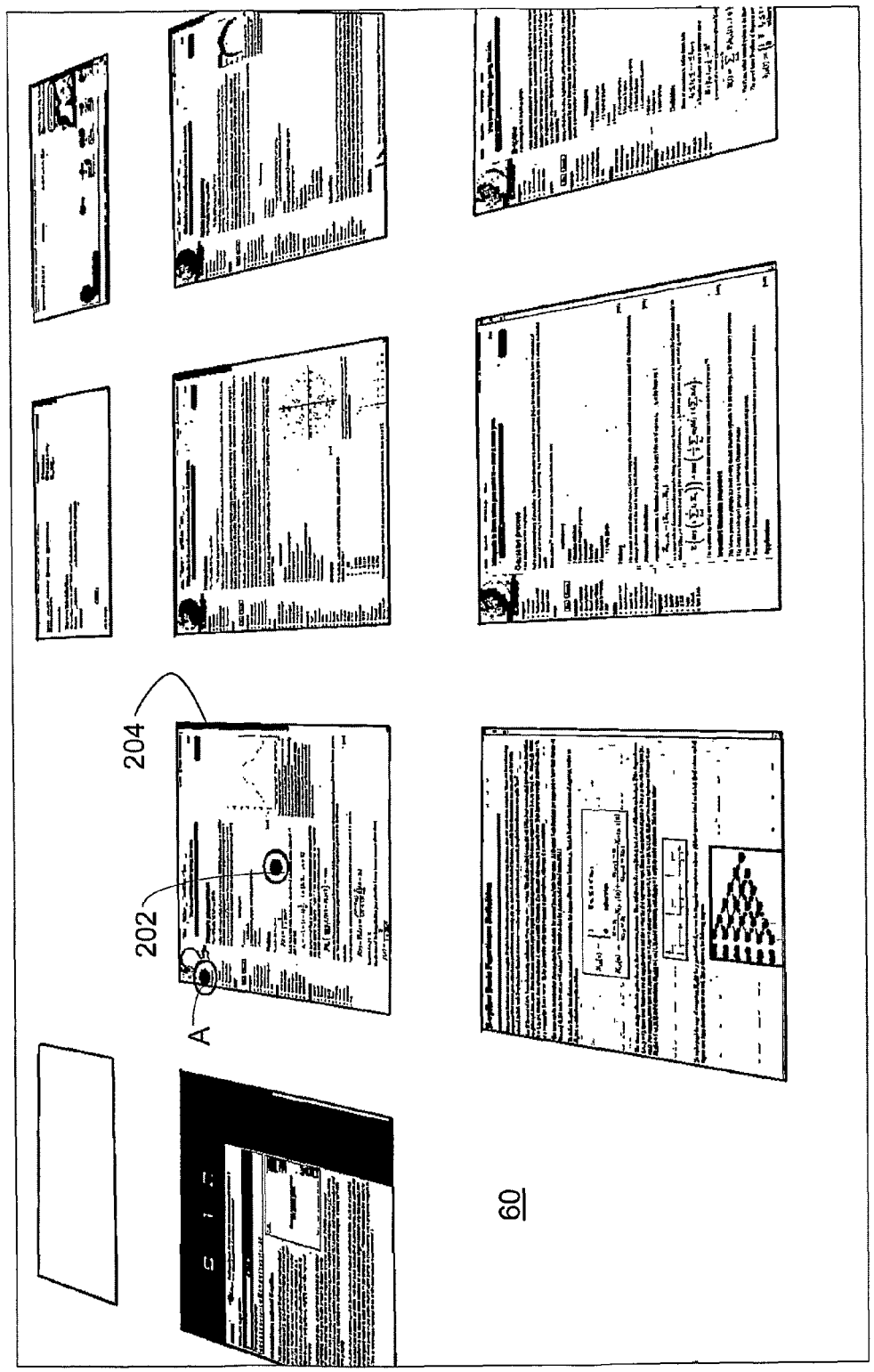
Figure 3C:
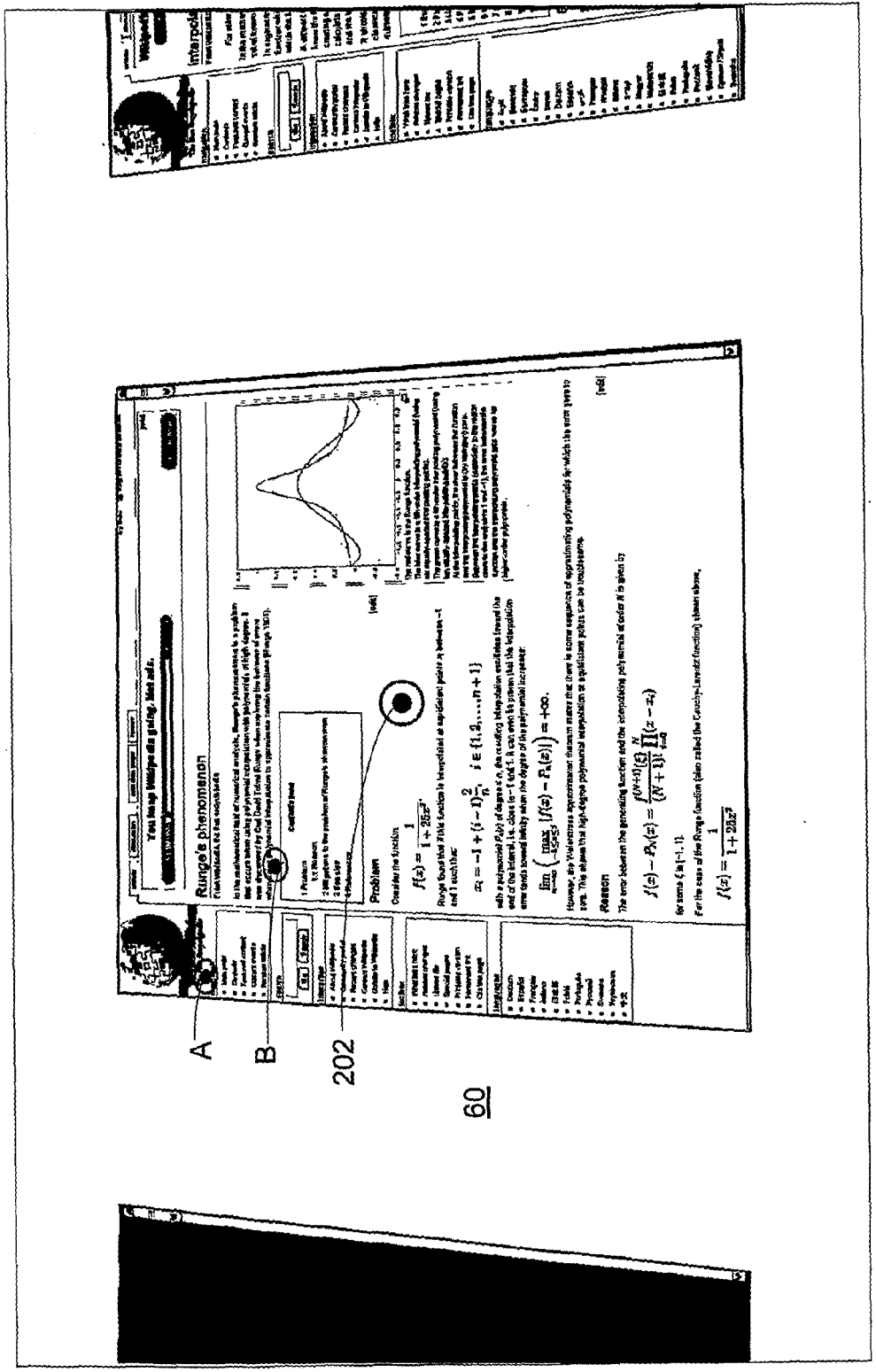
Figure 3D:
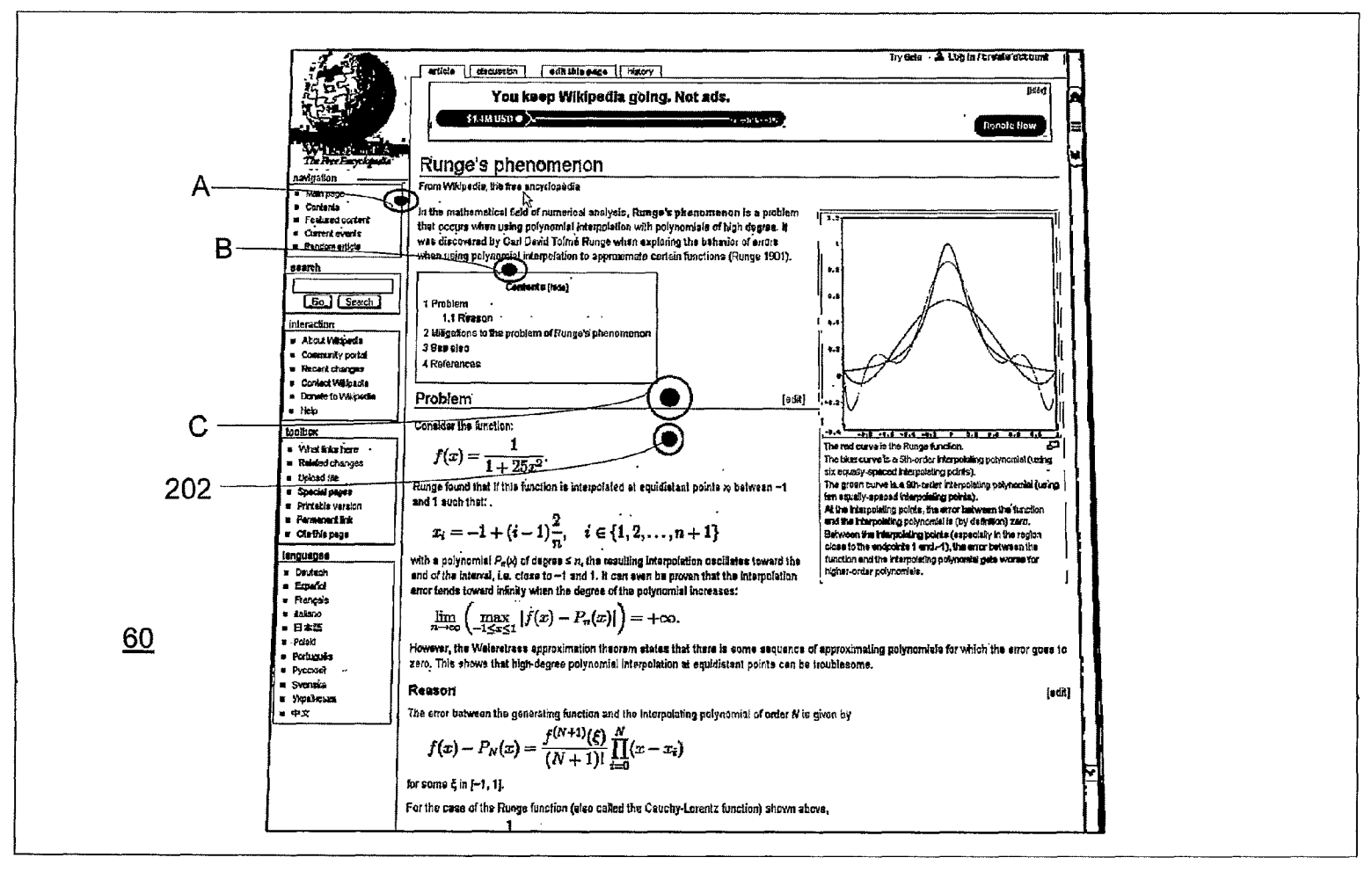

FIGS. 3a to 3d depict a sequence of screenshots of the 2D surface on the display device at three separate points along the zoom path as the view point is moved towards the target point in accordance with the invention. Several pages 200 have been positioned in the baseplane 60. A target point 202 has been selected in a page 204. FIG. 3a shows a projection of the 3D space from a relatively large distance from the target point 202. As the viewpoint approaches the target point, the amount of the 3D space projected onto the viewing surface decreases (the number of pages 200 projected onto the viewing surface decreases). Each of the screen shots of FIGS. 3b, 3c, and 3d show the current position of the target point 202 on the viewing surface as well as the position of the target point in the previous screen shots. (The position of the target point in FIG. 3a is labeled as "A" in FIGS. 3b to d, the position of the target point in FIG. 3b is labeled as "B" in FIGS. 3c and d, and the position of the target point in FIG. 3c is labeled as "C" in FIG. 3d). The target point 202 is thus seen to move monotonically towards the fixed point on the viewing surface (the fixed point is projected onto the center of the screenshots). As the zooming progressed, the bottom edges of the pages 204 remained parallel to the edge of the screenshot. In progressing from the screenshot of FIG. 3d, the page 204 appears to rotate so as to be viewed from above in order to enhance the legibility of the page content.

In various embodiments of this aspect of the invention, the angle $\alpha$ of each of the plurality of points on the zoom path is selected to provide an aesthetically acceptable zooming effect. For example, the angles $\alpha$ may be selected so that the target point is continuously projected onto the viewing surface each time the 3D space is projected onto the viewing surface. The angle $\alpha$ of each of the plurality of points on the zoom path may be selected so that the projection of the target point moves monotonically on the viewing surface towards or away from the fixed point on the viewing surface each time the 3D space is projected onto the viewing surface. The angle $\alpha$ of each of the plurality of points on the zoom path may be selected so that a line segment in the baseplane is projected onto a fixed line segment on the 2D viewing surface each time the 3D space is projected onto the viewing surface The angles $\alpha$ may be selected so that $\alpha$ has a continuous derivative between each pair of points $P_k$ and $P_{k+1}$. The angle $\alpha$ of the points on the zoom path may increase monotonically or decrease monotonically with decreasing distance from the target point. The length of the incremental step may have a length selected according to any one or more predetermined criteria, such as:

(a) A rate of change of the angle $\alpha$ is constant along at least a portion of the zoom path;
(b) A speed of the viewpoint along at least a portion of the zoom path is constant;
(c) A speed of a projection of the viewpoint on a plane along at least a portion of the zoom path is constant.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method implemented by a programmed computer, for zooming between a target point Po in a three-dimensional (3D) virtual space and a predetermined viewing point $P_{n+1}$ in the 3D space, the target point having an integer n≥2 of predetermined control points $P_1, \ldots P_k, \ldots P_n$ in the 3D space, the distance between $P_k$ to $P_0$ in the 3D space being less than the distance between $P_{k+1}$ to $P_0$ in the 3D space for all 1≤k<n−1, the points $P_0, \ldots P_n$ being coplanar in the 3D space, the point $P_k$, k=1 to n+1 having a predetermined viewing ray lying in a plane parallel to the plane of the points $P_0, \ldots P_n$, the viewing ray of the point $P_k$, k=1 to n+1 having a direction determined by an an $\alpha_k$, relative to a fixed ray in the plane of the points $P_0 \ldots P_k \ldots P_n$, for k=1, ... n+1, the method comprising:

(a) generating, a nonlinear zoom path in the 3D space between the predetermined viewing point $P_{n+t}$ and the control point $P_1$ by a method comprising generating a nonlinear zoom path in the 3D space between the predetermined viewing point $P_{n+t}$ and the control point $P_1$, the zoom path passing through the points $P_1, \ldots, P_m$, where m is an integer satisfying $1 \leq m \leq n$, wherein a projection of the zoom path onto the plane containing points $P_0, \ldots P_k, \ldots P_n$ has a continuous derivative;

(b) assigning to each of a plurality of points on the zoom path a viewing ray lying in a plane parallel to the plane of the points $P_0 \ldots P_n$;

(c) setting the predetermined viewpoint or the point $P_1$ as a current viewpoint;

(d) positioning a 2D viewing surface between the current viewpoint and the target point with the viewing ray of the current viewpoint $P_{n+1}$ pointing towards a predetermined fixed point on the viewing surface with the fixed point at a predetermined distance from the initial point;

(e) projecting at least a portion of the 3D space onto the viewing surface;

(f) moving the current viewpoint an incremental step along the zoom path to determine a new current viewing point;

(g) positioning the viewing surface so that the viewing ray of the new current viewing point points towards the fixed point on the viewing surface and so that the distance between the new current viewing point and the fixed point is the predetermined distance:

(h) projecting at least a portion of the 3D space onto the viewing surface;

(i) displaying the projection on the viewing surface on a display device; and (j) repeating steps (f) to (i) as required until the current viewing point is the point $P_1$ or the point $P_{n+1}$.

2. The method according to claim 1 wherein at least one point on the zoom path has exactly two coordinates in common with a control point selected from the control points $P_{m+1}, \ldots, P_n$.

3. The method according to claim 1 wherein a portion of the zoom path containing the points $P_1, \ldots, P_m$, is obtained by polynomial interpolation between $P_k$ and $P_{k+1}$ for k=1 to m−1.

4. The method according to claim 1 wherein the zoom path is a spline having a predetermined degree, the spline being obtained in a calculation involving the point $P_{n+1}$ and at least two of the points $P_0, \ldots P_n$.

5. The method according to claim 1 wherein for each of two or more candidate target points, the locations of the control points in the 3D space relative to the candidate target point is fixed for all target points.

6. The method according to claim 1 wherein, to each of a the plurality of points on the zoom path, a viewing angle is assigned having a direction specified by an angle α, relative to the fixed ray such that the viewing angle assigned to the point $P_k$ is $\alpha_k$, for any one of the points $P_k$ on the zoom path and wherein the angle α of each of the plurality of points on the zoom path is selected so that the target point is projected onto the viewing surface at each time step (h) is executed.

7. The method according to claim 6 wherein the projection of the target point moves monotonically on the viewing surface towards or away from the fixed point on the viewing surface during repeated executions of steps (f) to (i).

8. The method according to claim 1 wherein, to each of a the plurality of points on the zoom path, a viewing angle is assigned having a direction specified by an angle α, relative to the fixed ray such that the viewing angle assigned to the point $P_k$ is $\alpha_k$, for any one of the points $P_k$ on the zoom path and wherein the angle α of each of the plurality of points on the zoom path is selected so that a line segment in the 3D space is projected onto a fixed line segment on the 2D viewing surface each time step (h) is executed.

9. The method according to claim 1 wherein, to each of a the plurality of points on the zoom path, a viewing angle is assigned having a direction specified by an angle α, relative to the fixed ray such that the viewing angle assigned to the point $P_k$ is $\alpha_k$, for any one of the points $P_k$ on the zoom path and wherein the variation of the angle α along the zoom path has a continuous derivative between each pair of points $P_k$ and $P_{k+1}$.

10. The method according to claim 9 wherein the angle α of the points on the zoom path increases monotonically or decreases monotonically with decreasing distance from the target point.

11. The method according to claim 1 wherein, to each of a the plurality of points on the zoom path, a viewing angle is assigned having a direction specified by an angle α, relative to the fixed ray such that the viewing angle assigned to the point $P_k$ is $\alpha_k$, for any one of the points $P_k$ on the zoom path and wherein the angle α is selected so that $\alpha_k < \alpha_{k+1}$ for k=1, ... n or $\alpha_k > \alpha_{k+1}$ for k=1 to n.

12. The method according to claim 1 wherein the 3D space is projected onto the viewing surface in step (h) by a perspective projection determined by the viewing surface and the viewing ray of the current viewing point.

13. The method according to claim 1 wherein the incremental step has a length selected according to any one or more of the following criteria:
   (a) a rate of change of the angle α is constant along at least a portion of the zoom path;
   (b) a speed of the viewpoint along at least a portion of the zoom path is constant; and
   (c) a speed of a projection of the viewpoint on a plane along at least a portion of the zoom path is constant.

* * * * *